United States Patent
Gill (10) Patent No.: US 9,799,058 B2
(45) Date of Patent: Oct. 24, 2017

(54) VEHICLE VALUATION SYSTEM AND METHOD

(71) Applicant: Foribus, LLC., Renton, WA (US)

(72) Inventor: Faheem Gill, Renton, WA (US)

( * ) Notice: Subject to any disclaimer, the term of this patent is extended or adjusted under 35 U.S.C. 154(b) by 257 days.

(21) Appl. No.: 14/694,874

(22) Filed: Apr. 23, 2015

(65) Prior Publication Data

US 2016/0225035 A1     Aug. 4, 2016

Related U.S. Application Data

(60) Provisional application No. 62/110,510, filed on Jan. 31, 2015.

(51) Int. Cl.
| | |
|---|---|
| *G06Q 30/02* | (2012.01) |
| *G07C 5/00* | (2006.01) |
| *G07C 5/02* | (2006.01) |
| *G07C 5/08* | (2006.01) |
| *G06Q 40/08* | (2012.01) |

(52) U.S. Cl.
CPC ......... *G06Q 30/0278* (2013.01); *G06Q 40/08* (2013.01); *G07C 5/008* (2013.01); *G07C 5/02* (2013.01); *G07C 5/08* (2013.01)

(58) Field of Classification Search
CPC ........ G06Q 30/0278; G07C 5/08; G07C 5/02; G07C 5/008
See application file for complete search history.

(56) References Cited

U.S. PATENT DOCUMENTS

| | | | | |
|---|---|---|---|---|
| 6,064,970 | A * | 5/2000 | McMillan | G06Q 30/0283 340/439 |
| 7,113,853 | B2 | 9/2006 | Hecklinger | |
| 8,266,044 | B2 * | 9/2012 | Kaminsky | G06Q 40/025 705/37 |
| 8,578,500 | B2 * | 11/2013 | Long | G06F 21/55 726/22 |
| 8,595,079 | B1 | 11/2013 | Raines et al. | |
| 8,688,085 | B2 * | 4/2014 | White | G06Q 30/0267 455/410 |
| 9,086,941 | B1 * | 7/2015 | Siegel | G06F 8/65 |
| 9,165,319 | B1 * | 10/2015 | Henry | G06Q 30/0623 |
| 9,536,254 | B1 * | 1/2017 | David | G06Q 30/0278 |
| 2002/0065707 | A1 * | 5/2002 | Lancaster | G06Q 30/02 705/14.49 |
| 2005/0086070 | A1 * | 4/2005 | Engelman | G06Q 10/087 705/28 |
| 2010/0030586 | A1 * | 2/2010 | Taylor | G06Q 40/08 705/4 |
| 2012/0330723 | A1 * | 12/2012 | Hedy | G06Q 30/00 705/7.34 |

(Continued)

FOREIGN PATENT DOCUMENTS

WO     2014127323 A2     8/2014

*Primary Examiner* — Michael Zarroli
(74) *Attorney, Agent, or Firm* — Christopher Pilling (57) ABSTRACT

A method comprising steps (a) a vehicle comprising telemetric equipment is provided; (b) driving data is collected, wherein the driving data is collected using the telemetric equipment; (c) environmental data is collected; (d) vehicle original equipment manufacturer data comprising vehicle recall data and vehicle warranty claim data is collected; (e) vehicle pricing data is collected, wherein the pricing data is collected from external sources; and (f) a vehicle valuation is generated.

14 Claims, 8 Drawing Sheets

(56) References Cited

U.S. PATENT DOCUMENTS

2013/0339205 A1* 12/2013 Vann-Adibe .......... G06Q 40/00
                                                    705/35
2014/0058618 A1   2/2014 Rude et al.
2014/0095214 A1*  4/2014 Mathe .................... G06Q 40/08
                                                    705/4
2015/0005981 A1   1/2015 Grimm et al.
2016/0042376 A1*  2/2016 Luther ............... G06Q 30/0206
                                                    705/7.35

* cited by examiner

VEHICLE VALUATION SYSTEM AND METHOD

CROSS-REFERENCE TO RELATED APPLICATIONS

This application claims priority to U.S. Provisional Patent Application Ser. No. 62/110,510, filed Jan. 31, 2015, the entire disclosure of which is hereby expressly incorporated by reference herein.

BACKGROUND OF THE INVENTION

1. Field of the Invention

The present invention is in the technical field of data processing. More particularly, the present invention relates a vehicle valuation system and method.

2. Discussion of the State of the Art

In the art of vehicle valuation, it is important to receive an accurate valuation of a particular vehicle. If a consumer has a proper valuation of a vehicle, the consumer has a better understanding the vehicle's true value and market price, as well as an accurate sale price if the consumer wishes to offer the vehicle for sale.

There are many vehicle valuation on-line websites, as well as brick-and-mortar vehicle valuation services known in the art. However, the prior art fails to truly provide an accurate valuation without knowing the specific driving history of a specific vehicle. Consequently, the subject matter claimed attempts to solve these disadvantages by providing an accurate vehicle valuation system and method.

BRIEF SUMMARY OF THE INVENTION

In one embodiment of the present invention, a method is provided comprising steps (a) a vehicle comprising telemetric equipment is provided; (b) driving data is collected, wherein the driving data is collected using the telemetric equipment; (c) environmental data is collected; (d) vehicle original equipment manufacturer data comprising vehicle recall data and vehicle warranty claim data is collected; (e) vehicle pricing data is collected, wherein the pricing data is collected from external sources capturing a market price for the vehicle; and (f) a vehicle valuation is generated.

In one embodiment, in step (a), the vehicle comprises a dashboard, a front bumper system, and a rear bumper system, wherein the telemetric equipment is installed on the front bumper system, the rear bumper system, on the dashboard, and under the dashboard. Yet in another embodiment, in step (a), the telemetric equipment comprises on-board diagnostics (OBDII), dedicated short-range communications (DSRC), Wi-Fi, 802.11p, and long-term evolution (LTE) telecommunication, wherein the dedicated short-range communications (DSRC) are installed on the front bumper system and the rear bumper system.

In one embodiment, in step (b), the vehicle driving data comprises data on vehicle lane changing, vehicle tailgating, distance to other vehicles, and data collected from road signs and traffic lights. Also in one embodiment, in step (b), the vehicle driving data further comprises vehicle fuel usage, vehicle speed, vehicle revolutions per minute (RPM), vehicle braking data, vehicle acceleration data, current time, and diagnostic codes.

In one embodiment, in step (c), the environmental data comprises weather conditions based on the geolocation of the vehicle. In one embodiment, in step (f), the vehicle valuation is compared to a market price for similar vehicles, wherein the market price is based on vehicle sales and historical data. Also in one embodiment there is further a step wherein the vehicle original equipment manufacturer data is compared to the vehicle driving data and environmental data.

In another aspect of the invention, a system is provided comprising an Internet-connected computerized appliance having a processor and coupled to a data repository, the processor executing software from a non-transitory medium, the software providing an interactive interface to a system, the system enabling a user to log on and enter vehicle information; access a vehicle report comprising vehicle data; access a driving score; and access a vehicle valuation. In one embodiment, vehicle information comprises a vehicle license plate number, an asset code, a vehicle make, a vehicle year, and a vehicle model. Also in one embodiment, vehicle data comprises data correlating to the time the vehicle spent over-speeding, a number of instances of vehicle hard braking, a number of instances of vehicle hard acceleration, a time the vehicle spent redlining, a distance the vehicle has driven, and a total time the data has been recording. In another embodiment, the driving score is correlated to the vehicle data. Yet in another embodiment, vehicle valuation is compared to a market price for similar vehicles, wherein the market price is based on vehicle sales and historical data.

DETAILED DESCRIPTION OF THE INVENTION

In one embodiment of the instant invention the inventor provides a vehicle valuation system and method which provides users an accurate valuation for a vehicle. The system in a preferred embodiment comprises vehicle telemetrics for capturing real-time data and environmental conditions. The real-time data and environmental conditions are captured and sent to a valuation algorithm, wherein a vehicle valuation is provided. The system and methods of the invention are described in detail below.

Figure 1:
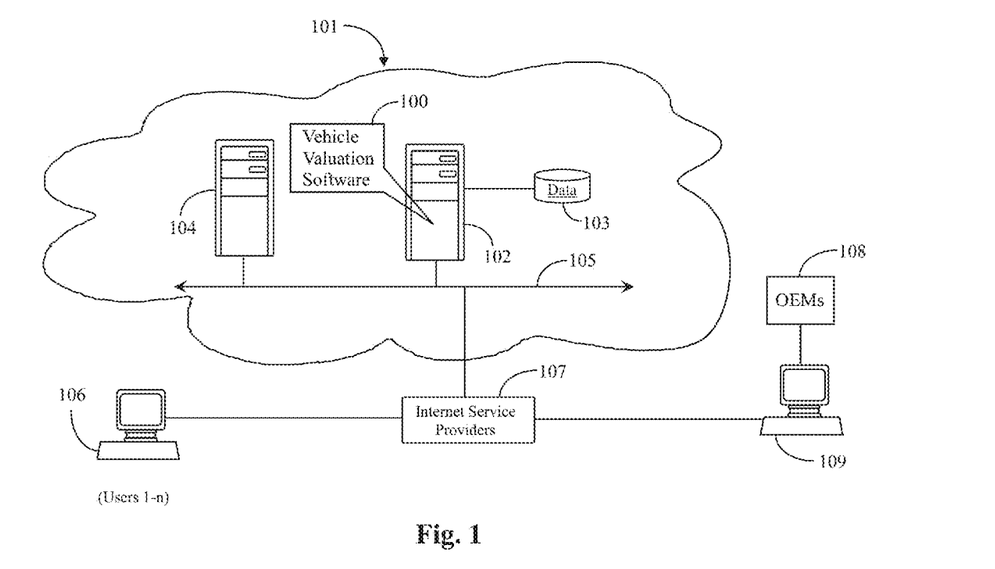
FIG. 1 is an architectural diagram of an Internet mobile computer network system according to an embodiment of the present invention.

FIG. 1 is an architectural diagram of an Internet mobile computer network system 101 according to an embodiment of the present invention. The Internet-connected system comprises one or more Internet-connected servers 102, executing vehicle valuation software 100 from non-transitory media. Server 102 is connected to a data repository 103, which may be any sort of data storage known in the art. The system further comprises a third party Internet-connected server 104 connected to Internet backbone 105. Although one third party Internet-connected server 104 is shown, it is understood that potentially millions of other similar servers are connected to the Internet via Internet backbone. A number of users (1-n) 106 on a computing device are connected to the Internet-connected server via an Internet service provider (ISP) 107, allowing users 106 to access the vehicle valuation software. The system further comprises original equipment manufacturers (OEMs) 108 using a computing device 109 to access the vehicle valuation software via the Internet service provider and Internet backbone.

Figure 2:
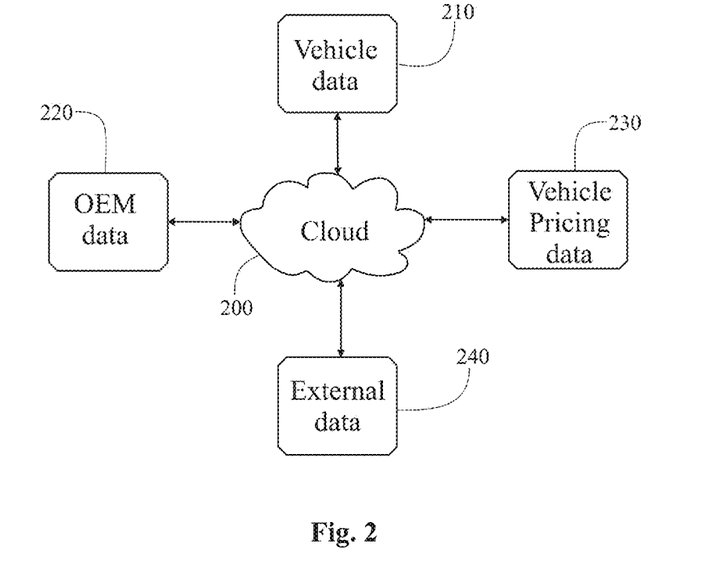
FIG. 2 is an architectural diagram of a cloud communication system according to an embodiment of the present invention.

FIG. 2 is an architectural diagram of a cloud communication system 200 according to an embodiment of the present invention. The cloud communication system comprises vehicle data 110, original equipment manufacturer (OEM) data 220, vehicle pricing data 230, and external data 240. The vehicle data is captured by a plurality of vehicle telemetrics equipment and technology including but not limited to on-board diagnostics (OBDII), dedicated short-range communications (DSRC), Wi-Fi, 802.11p, and long-term evolution (LTE) telecommunication. The plurality of vehicle telemetrics equipment captures real-time driving data and environmental conditions that are used for vehicle valuation purposes. This will be discussed in greater detail below.

Still referring to FIG. 2, the original equipment manufacturer data is also captured. Original equipment manufacturer data 220 comprises vehicle manufacturer data, recall data, and warranty claim data. This data is helpful for vehicle manufactures, vehicle dealerships, and vehicle engineering departments to have a better understanding of the correlation of real-time driving data and environmental conditions with warranty claims. Vehicle pricing data 230 comprises a plurality of vehicle pricing data from $3^{rd}$ party vendors, subscriptions, crowdsourced data, and regional websites capturing the market price for specific vehicles in similar conditions. External data 240 comprises environmental data such as weather conditions based on the geolocation of each specific vehicle that the external data is being captured from. The external data can also be mapped with the original equipment manufacturer data to see the correlation between environmental conditions and warranty claims.

Figure 3:
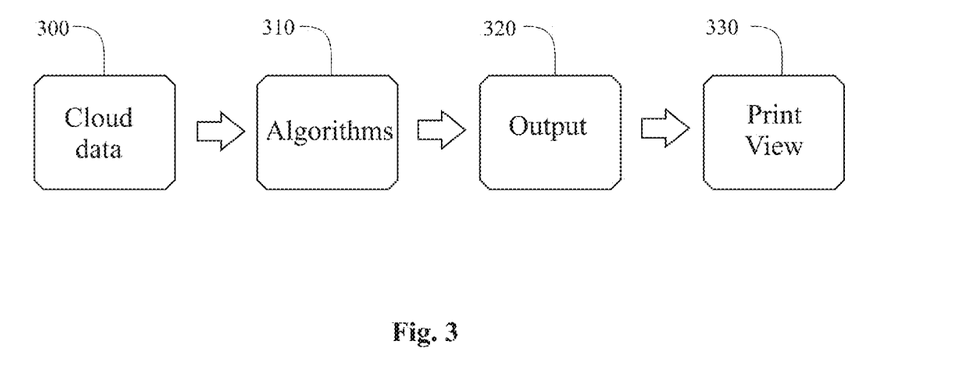
FIG. 3 is an architectural diagram of a data transfer system according to an embodiment of the present invention.

FIG. 3 is an architectural diagram of a data transfer system according to an embodiment of the present invention. Cloud data 300 captured from the cloud communication system 200 (FIG. 2) is transferred to algorithms 310. After the data is processed by the algorithms it is sent to output 320. Output 320 includes an Internet or mobile generated report via software 100 (FIG. 1). The report includes information such as specific vehicle conditions and vehicle valuation. A user or business entity may purchase the report online via an online payment system. Once purchase the user or business entity, such as a vehicle dealership, may print or view 330 the report.

Figure 4:
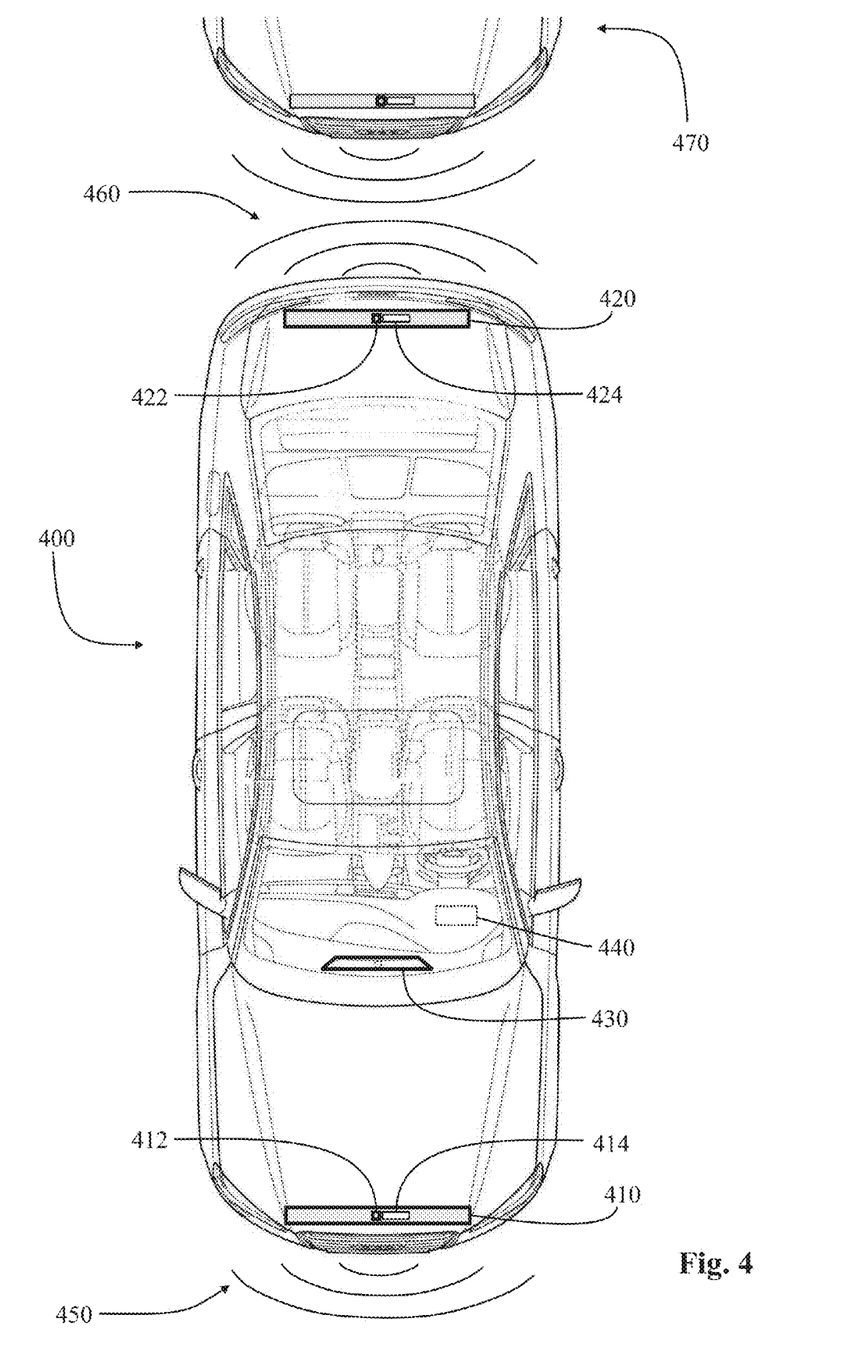
FIG. 4 is a plan view illustrating a vehicle valuation system according to an embodiment of the present invention

FIG. 4 is a plan view illustrating a vehicle valuation system according to an embodiment of the present invention. The vehicle valuation system comprises a vehicle 400 including a dedicated short-range communication (DSRC) 410 installed on front bumper of vehicle. DSRC comprises power source and antenna 412, as well as DSRC chipset 414. Likewise, a DSRC 420 is installed on rear bumper of vehicle, comprising power source and antenna 422, as well as DSRC chipset 424. Both DSRC chipsets 414/424 are in communication with a Human Machine Interface (HMI) located in the vehicle via a dashboard plug-in 430. The HMI provides driver feedback, and displays a driving score, which will be described in greater detail below. The DSRC chipsets will send driving data received 450/460 to the cloud 200 (FIG. 2) via a dashboard OBDII plug-in 440. The driving data includes data on vehicle lane changing, vehicle tailgating, and distance to other vehicles 470, and data collected from any road signals, such as road signs and traffic lights. Vehicle data from the engine is also collected via the OBDII plug-in 440, wherein the vehicle data includes fuel usage, vehicle speed, vehicle revolutions per minute (RPM), vehicle braking data, vehicle acceleration data, current time, and diagnostic codes.

Figure 5:
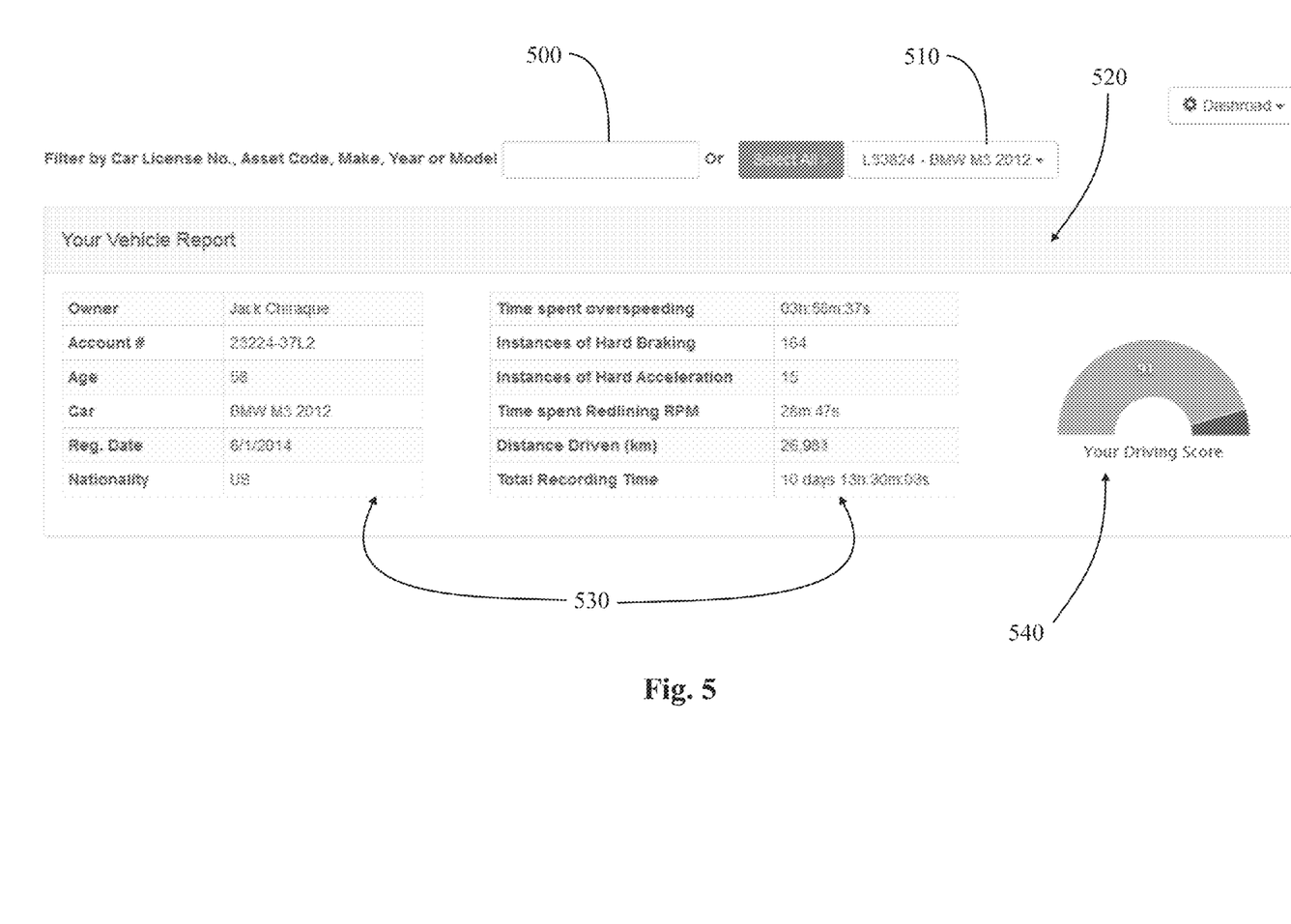
FIG. 5 is a screenshot of a user interface illustrating an example of a user dashboard according to an embodiment of the present invention.

FIG. 5 is a screenshot of a user interface illustrating an example of a user content dashboard according to an embodiment of the present invention. The user content dashboard can be accessed via software 100 (FIG. 1). The user content dashboard includes the ability to enter vehicle information 500, such as vehicle license plate number, asset code, region, vehicle make, vehicle year, or vehicle model. The user may also select from a previous used vehicle from list 510. After selection of vehicle, the vehicle report is shown 520. The vehicle report includes a plurality of information 530 and a vehicle driving score 540. The plurality of information includes but is not limited to user name, account number, age, vehicle information, registration date, and user nationality. In addition, the plurality of information includes driving data including but not limited to time the vehicle spent over-speeding, the number of instances of hard braking, the number of instances of hard acceleration, time the vehicle spent redlining (high RPM), distance driven, and the total time the data has been recording. The time the vehicle spend over-speeding is determined by real time global positioning system (GPS) data correlated to defined road speed limits. Hard braking and hard acceleration are defined as an event in which more force than normal is applied to the vehicle's brake or vehicle's accelerator respectively. The force is predetermined and may be adjusted. For instance, in some embodiments, hard braking is defined as an event where a vehicle decelerates faster than 7 miles per hour (MPH) per second. In some embodiments, hard braking and hard acceleration are defined as a gravitation force (g-force) less than or equal to 0.45 g and greater or equal to 0.35 g respectively.

Still referring to FIG. 5, the vehicle driving score is generated based on the collected data. Driving score 540 illustrates a numerical value to the user evaluating their driving habits and driving data. A user's vehicle driving score increases with less negative data captured. For instance, fewer instances of hard braking and hard acceleration would increase the user's vehicle driving score. Similarly, more time spend over-speeding or time spent redlining would decrease the user's vehicle driving score.

Figure 6:
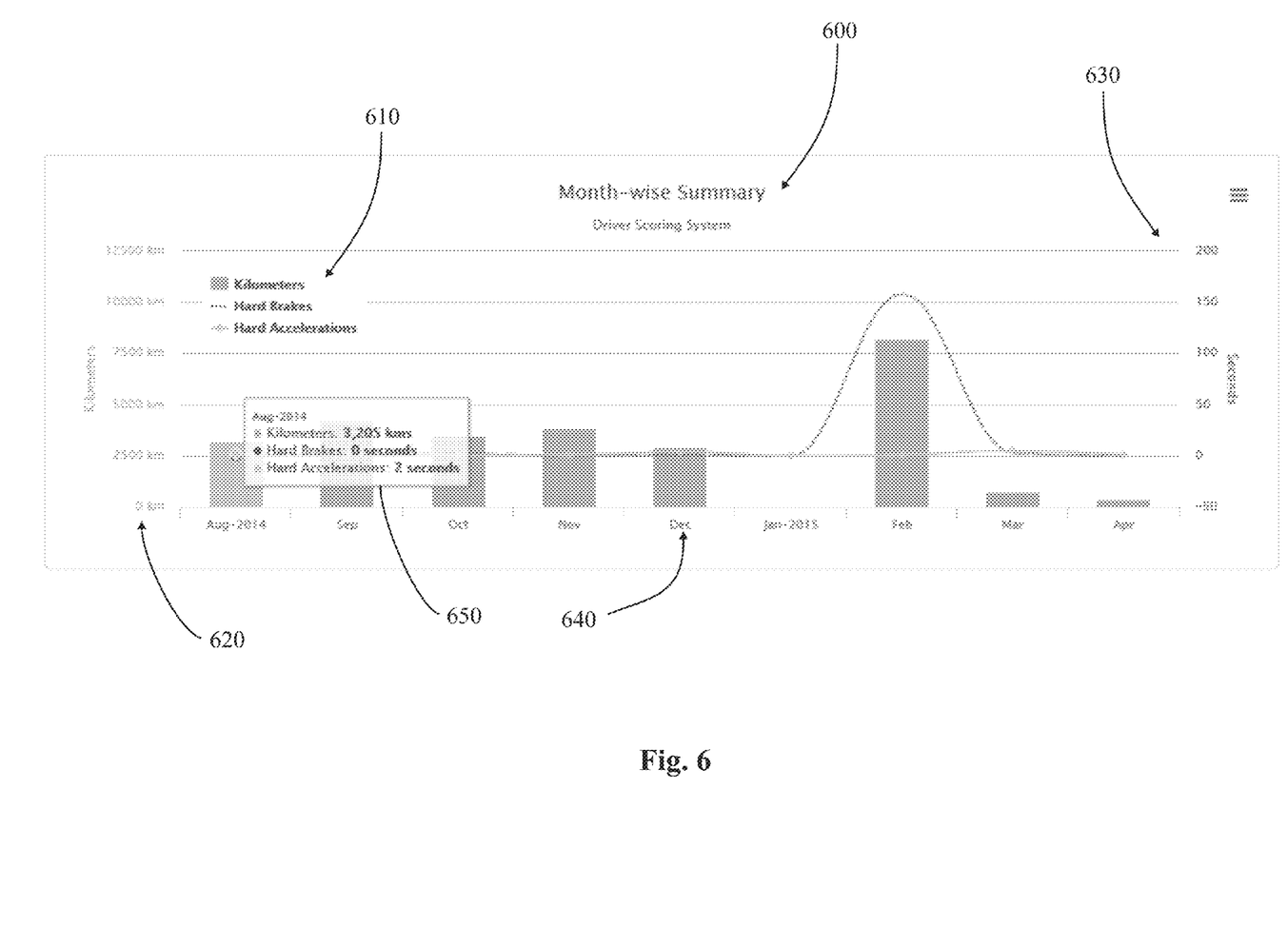
FIG. 6 is a screenshot of a user interface illustrating an example of aggregated data according to an embodiment of the present invention.

FIG. 6 is a screenshot of a user interface illustrating an example of aggregated data according to an embodiment of the present invention. In the instant example, an illustration of a month-wise driving data summary 600 is shown. The summary includes driving data 610 aggregated on a graph. The graph comprises a first vertical axes 620 in distance, such as miles or kilometers, a second vertical axes in time represented in seconds 630, and horizontal axes 640 illustrating time in months. A user may prompt a detailed view 650 of a specific month, showing a breakdown of the specific driving data captured for the specific month. The graph illustrates a user's driving data visually over several months.

Figure 7:
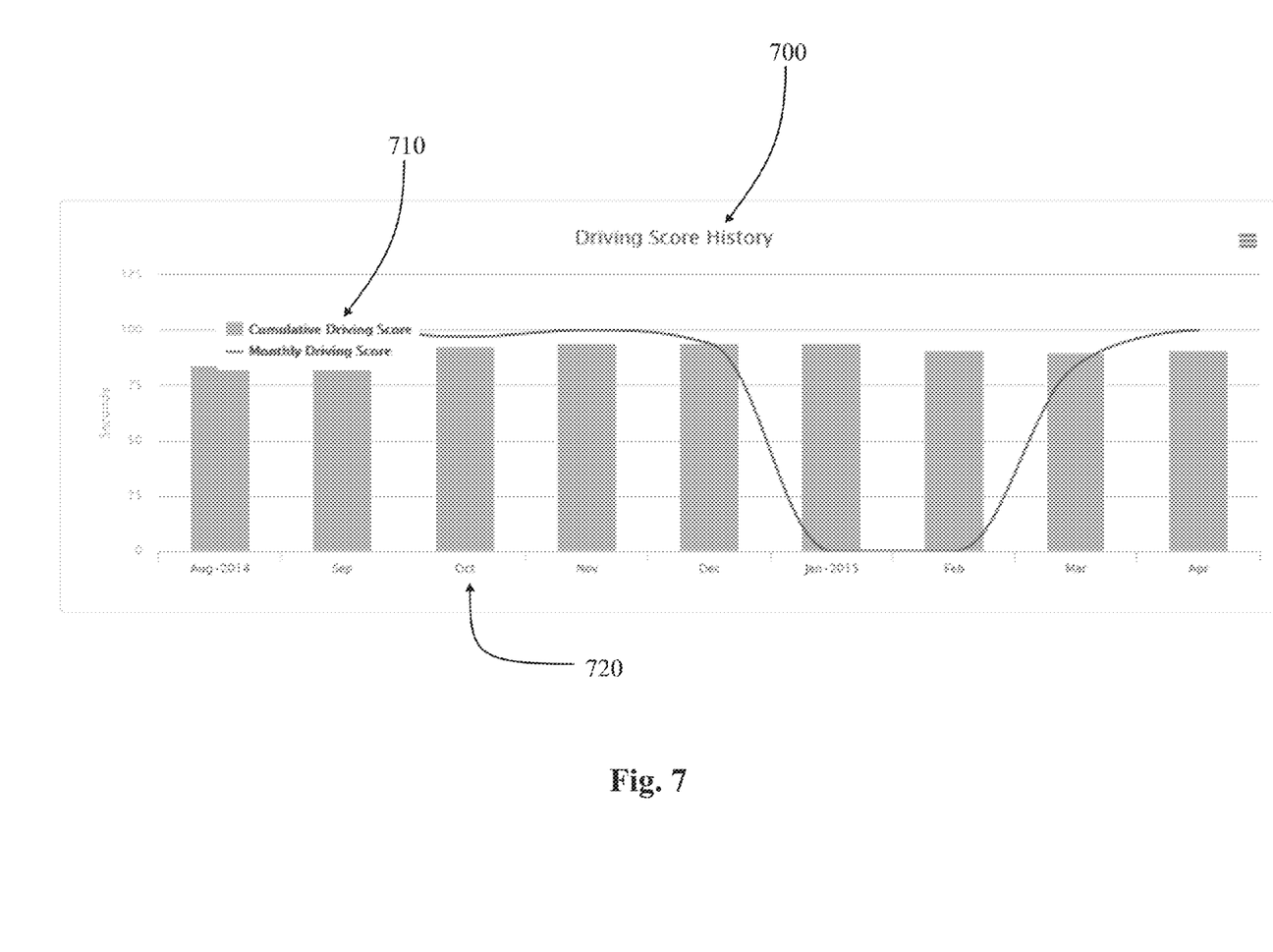
FIG. 7 is a screenshot of a user interface illustrating an example of aggregated data according to an embodiment of the present invention.

FIG. 7 is a screenshot of a user interface illustrating an example of aggregated data according to an embodiment of the present invention. In the instant example, an illustration of a driving score history 700 is shown. This history includes both the cumulative driving score and monthly driving score mapped on graph in relation to time 720, represented by months. This illustrates a user's driving score visually over several months.

Figure 8:
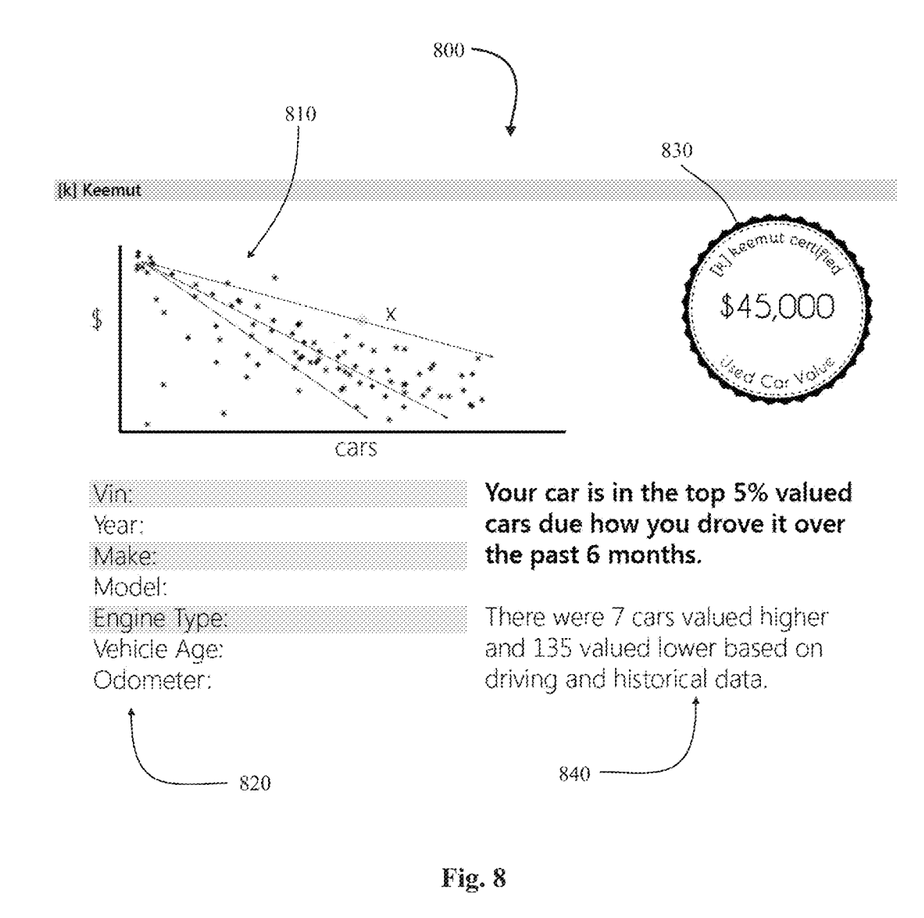
FIG. 8 is a screenshot of a user interface illustrating an example of a vehicle valuation according to an embodiment of the present invention.

FIG. 8 is a screenshot of a user interface illustrating an example of a vehicle valuation 800 according to an embodiment of the present invention. The vehicle valuation includes valuation graph 810, vehicle information 820, vehicle valuation amount 830, and description 840. The valuation graph is a representation of the vehicle pricing data 230 (FIG. 2) for vehicles similarly matching the vehicle information 820, including vehicle year, vehicle make, vehicle model, vehicle engine type, vehicle age, and vehicle odometer reading. The vehicle information also includes a vehicle identification number (VIN). A user's vehicle valuation amount 830 is shown in a currency dollar amount which is also represented on the valuation graph. This representation is compared to the other vehicle pricing data in the description 840. The description provides the user with comparative results. For instance, in the screenshot illustrated a user's values amount is $45,000, which is valued in the top 5% as there were only 7 cars valued higher, and 135 cars valued lower. This vehicle data is based on the driving data and historical pricing data captured, as described above.

Figure 9:
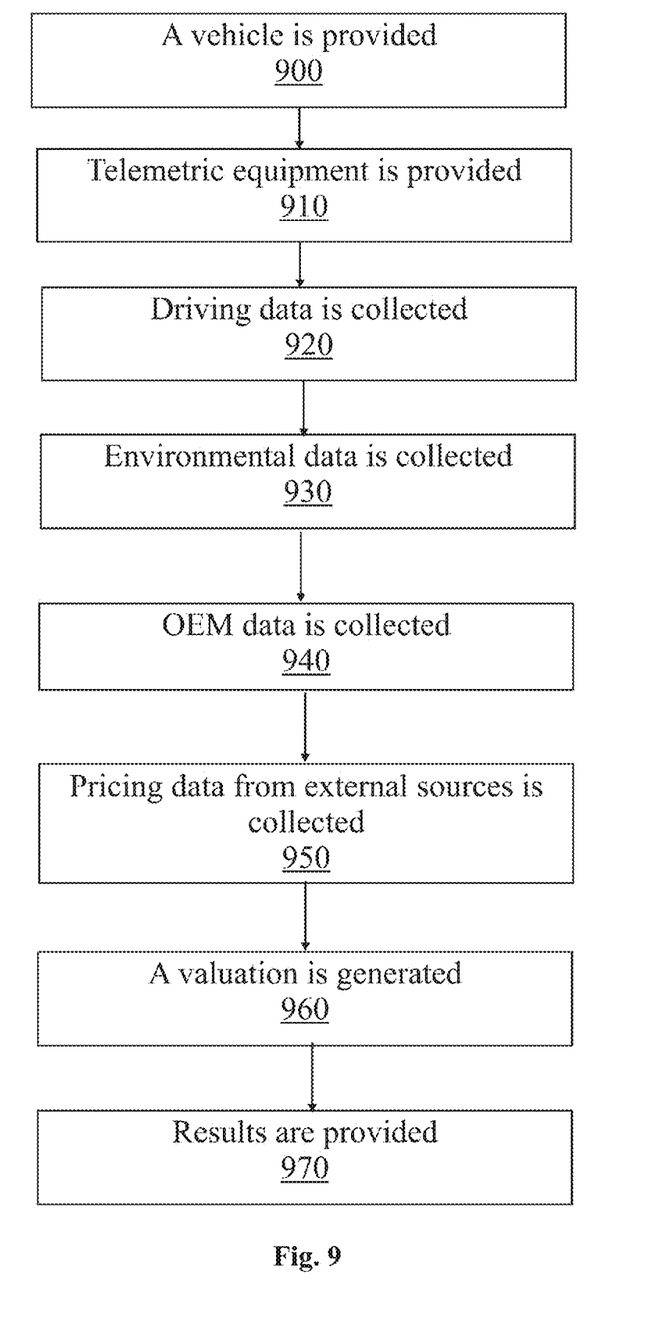
FIG. 9 is a flowchart illustrating a vehicle valuation method according to an embodiment of the present invention.

FIG. 9 is a flowchart illustrating a vehicle valuation method according to an embodiment of the present invention. In step 900, a vehicle is provided. In step 910, telemetric equipment is provided. The telemetric includes on-board diagnostics (OBDII), dedicated short-range communications (DSRC), Wi-Fi, 802.11p, and long-term evolution (LTE) telecommunication. In step 920, driving data is collected via telemetric equipment. In step 930, environmental data is collected. The environmental data includes weather data collected from commercial weather services, wherein the weather data is matched to the geolocation of the vehicle to warn drivers of approaching storms, or dangerous weather conditions. Commercial weather services may include $3^{rd}$ party web weather resources, and national weather on-line websites. In step 940, original equipment manufacturer (OEM) data is collected. OEM data includes warranty claim data. In step 950, pricing data from external sources is collected. External sources comprise $3^{rd}$ party vendors and regional websites capturing the market price for specific vehicles. In step 960, a vehicle valuation is generated. The vehicle valuation includes a vehicle valuation amount in local currency. In step 970, results are provided. The results include specific valuation information and aggregated data summaries. The results further includes data analytics, which is helpful for vehicle manufactures, vehicle dealerships, and vehicle engineering departments to have a better understanding of the correlation of real-time driving data and environmental conditions with warranty claims.

It will be apparent to one with skill in the art, that the embodiments described above are specific examples of a single broader invention which may have greater scope than any of the singular descriptions taught. There may be many alterations made in the descriptions without departing from the spirit and scope of the present invention.

What is claimed is:

1. A method comprising steps:
(a) a vehicle comprising telemetric equipment is provided, wherein the telemetric equipment includes on-board diagnostics (OBDII), dedicated short-range communications (DSRC), Wi-Fi, 802.11p, and long-term evolution (LTE) telecommunication, wherein the dedicated short-range communications (DSRC) includes a power source, an antenna, and a chipset;
(b) driving data is collected, wherein the driving data is collected using the telemetric equipment;
(c) environmental data is collected;
(d) vehicle original equipment manufacturer data comprising vehicle recall data and vehicle warranty claim data is collected;
(e) vehicle pricing data is collected, wherein the pricing data is collected from external sources capturing a market price for the vehicle; and
(f) a vehicle valuation is generated.

2. The method of claim 1, the vehicle comprises a dashboard, a front bumper system, and a rear bumper system, and wherein the dedicated short-range communications (DSRC) is installed on both the front and rear bumper system, and the on-board diagnostics (OBDII) is installed under the dashboard.

3. The method of claim 2, further comprising a step of displaying a driving score to a user via a Human Machine Interface (HMI) located in the dashboard, wherein the driving score is based on the driving data collected.

4. The method of claim 1, wherein in step (b), the vehicle driving data comprises data on vehicle lane changing, vehicle tailgating, distance to other vehicles, and data collected from road signs and traffic lights.

5. The method of claim 4, wherein in step (b), the vehicle driving data further comprises vehicle fuel usage, vehicle speed, vehicle revolutions per minute (RPM), vehicle braking data, vehicle acceleration data, current time, and diagnostic codes.

6. The method of claim 1, wherein in step (c), the environmental data comprises weather data collected from commercial weather services, wherein the weather data is matched to the geolocation of the vehicle.

7. The method of claim 1, wherein in step (f), the vehicle valuation is compared to a market price for similar vehicles, wherein the market price is based on vehicle sales and historical data.

8. The method of claim 1, further providing a step wherein the vehicle original equipment manufacturer data is compared to the vehicle driving data and environmental data.

9. A system comprising:
an Internet-connected computerized appliance having a processor and coupled to a data repository, the processor executing software from a non-transitory medium, the software providing an interactive interface to a system, the system enabling a user to:
log on and enter vehicle information corresponding to a vehicle, wherein the vehicle comprises telemetric equipment including on-board diagnostics (OBDII), dedicated short-range communications (DSRC), Wi-Fi, 802.11p, and long-term evolution (LTE) telecommunication, wherein the dedicated short-range communications (DSRC) includes a power source, an antenna, and a chipset;
access a vehicle report comprising vehicle data;

access a driving score; and
access a vehicle valuation.

10. The system of claim 9, wherein the vehicle information comprises a vehicle license plate number, an asset code, a region, a vehicle make, a vehicle year, and a vehicle model.

11. The system of claim 9, wherein the vehicle data comprises data correlating to the time the vehicle spent over-speeding, a number of instances of vehicle hard braking, a number of instances of vehicle hard acceleration, a time the vehicle spent redlining, a distance the vehicle has driven, and a total time the data has been recording.

12. The system of claim 11, wherein the driving score is correlated to the vehicle data.

13. The system of claim 9, wherein the vehicle valuation is compared to a market price for similar vehicles, wherein the market price is based on vehicle sales and historical data.

14. A method comprising steps:
 (a) providing a vehicle, wherein the vehicle comprises a dashboard, a front bumper system, a rear bumper system, and telemetric equipment, wherein the telemetric equipment includes on-board diagnostics (OBDII), dedicated short-range communications (DSRC), Wi-Fi, 802.11p, and long-term evolution (LTE) telecommunication, wherein the dedicated short-range communications (DSRC) includes a power source, an antenna, and a chipset, wherein the dedicated short-range communications (DSRC) is installed on both the front and rear bumper system, and the on-board diagnostics (OBDII) is installed under the dashboard;
 (b) collecting driving data, wherein the driving data is collected using the telemetric equipment;
 (c) collecting environmental data;
 (d) collecting vehicle original equipment manufacturer data, the original equipment manufacturer data includes vehicle recall data and vehicle warranty claim data;
 (e) collecting vehicle pricing data, wherein the pricing data is collected from external sources capturing a market price for the vehicle;
 (f) generating a vehicle valuation; and
 (g) displaying a driving score to a user via a Human Machine Interface (HMI) located in the dashboard, wherein the driving score is based on the driving data collected.

* * * * *